A. DE KLEIST & S. A. SWANSON.
MOUNTING FOR ELECTRIC MOTORS.
APPLICATION FILED APR. 23, 1915.
1,169,133.
Patented Jan. 25, 1916.
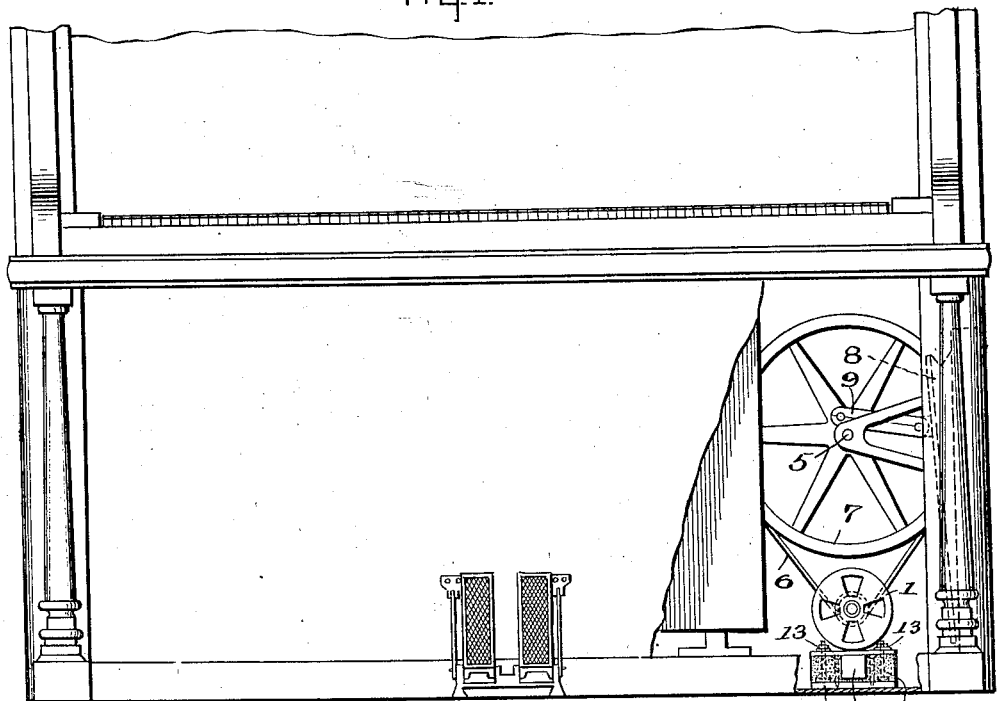
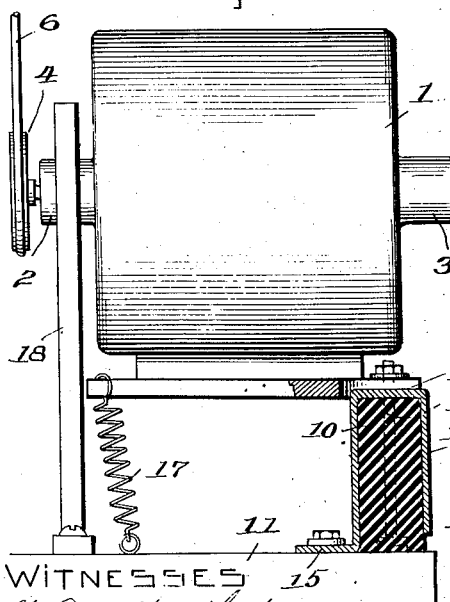
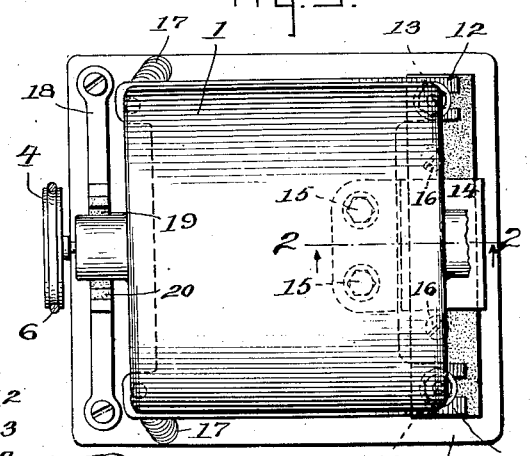
INVENTORS
August deKleist,
Selvigor A. Swanson
by Geyer & Popp
ATTORNEYS
WITNESSES
W. Ray Taylor
Julius J. Prible

UNITED STATES PATENT OFFICE.

AUGUST DE KLEIST AND SELVIYOR A. SWANSON, OF NORTH TONAWANDA, NEW YORK, ASSIGNORS TO THE RUDOLPH WURLITZER MANUFACTURING COMPANY, OF NORTH TONAWANDA, NEW YORK, A CORPORATION OF NEW YORK.

MOUNTING FOR ELECTRIC MOTORS.

1,169,133.   Specification of Letters Patent.   Patented Jan. 25, 1916.

Application filed April 23, 1915. Serial No. 23,435.

*To all whom it may concern:*

Be it known that we, AUGUST DE KLEIST and SELVIYOR A. SWANSON, citizens of the United States, and residents of North Tonawanda, in the county of Niagara and State of New York, have invented new and useful Improvements in Mountings for Electric Motors, of which the following is a specification.
This invention relates to a support or mounting designed more especially for the electric motors employed for driving the main bellows and other movable parts of player-pianos and similar automatic instruments, but the invention is not confined to mountings for that particular type of motors. Such motors, especially those of the alternating type, when rigidly mounted upon their supports, produce a humming noise by their vibration which is objectionable in such instruments.

The chief object of our invention is the provision of a simple and inexpensive mounting for such a motor which will absorb its vibrations and deaden the sounds resulting therefrom, producing a practically silent motor.

A further object is to so construct the mounting that it can be readily installed and repaired.

In the accompanying drawings: Figure 1 is a sectional front elevation of a player-piano equipped with the improvement. Fig. 2 is an enlarged sectional elevation of the motor and the mounting, the plane of the sectional portion being on line 2—2, Fig. 3. Fig. 3 is a top plan view of said parts. Fig. 4 is a rear view thereof.

Similar characters of reference indicate corresponding parts in the several views.

1 indicates the casing of the electric motor, 2 and 3 the bearings of the armature shaft and 4 the driving pulley mounted on said shaft. In the example illustrated in the drawings, motion is transmitted from said pulley to a crank shaft 5 by a belt 6 and a pulley 7, this crank shaft in turn actuating the bellows pump 8 (shown by dotted lines) through a link 9.
The rear portion of the motor is suspended from the driving belt 6, while its front portion is carried by a flexible or resilient block or cushion 10 of soft rubber or other suitable material. This block is mounted upon a suitable base which may be the bottom of the piano case, but preferably consists of a separate board 11, resting on said bottom, as shown. The base of the motor is provided at its front corners with the customary forked lugs 12 which rest upon the end portions of said block and are secured thereto by appropriate fastenings, such as vertical bolts 13. The headed lower ends of these bolts preferably terminate short of the base board 11, as shown by dotted lines in Fig. 2, so as not to strike the same under the vertical vibrations of the front portion of the motor. The block 10 may be secured to its support 11 by any suitable means, the devices shown in the drawings consisting of a metallic clip or strap 14 bolted to said support at 15 and embracing the central portion of the block, and screws 16 arranged on opposite sides of said clamp.

Tension springs 17 connect the rear portions or corners of the motor-base with the base 11 and serve to keep the driving belt 6 taut.

The block 10 forms a flexible as well as resilient support for the motor, which allows it to vibrate or rock to a limited extent, the block absorbing the vibrations of the motor and transmitting practically none of them to the piano case, thus muffling or deadening the humming sound ordinarily produced by such a motor when rigidly mounted and rendering it noiseless. While effecting this desirable result, the device at the same time performs the additional function of an efficient belt tightener.

To guard against displacement of the motor during shipment of the instrument, a suitable guide or retainer 18 is preferably employed. In the form shown in the drawings, this guide consists of a standard secured to the base 11 and provided in its upper portion with a vertical slot 19 in which the rear bearing 2 of the armature shaft is free to play vertically but held from lateral displacement in transit. This slot may be lined with felt 20 or other suitable sound deadening material.

The motor can be readily removed for repairs or replaced by a new one, by simply loosening the nuts of the bolts 13 and detaching the upper ends of the springs 17 from the motor-base. The block 10 can also be readily renewed when required.

While the improved mounting is herein shown and described in connection with an electric motor for a player-piano, it is also applicable to motors for other purposes.

We claim as our invention:

1. A motor-mounting comprising means for supporting one end of the motor, and a resilient block supporting the other end thereof.

2. The combination of a motor, a driving belt for suspending one end of the motor, a tension device connected with the suspended end of the motor, and a resilient block supporting the other end of the motor.

3. The combination of a motor, a driving belt for suspending one end of the motor, a resilient block supporting the other end of the motor, and a tension spring connected with the suspended end of the motor and tending to tighten said belt.

4. The combination of a support, a resilient block secured between its ends to said support, a motor having one end of its base mounted on the end-portions of said block, and means for suspending the other end of the motor.

5. The combination of a support, a resilient block secured to said support, a motor having one end of its base mounted on the end-portions of said block, means for fastening said base to the block, said means being detached from said support, and means for carrying the opposite end of the motor.

6. A motor-mounting comprising a support, a resilient block resting thereon, a clip secured to said support and embracing the central portion of the block, a motor having one end of its base mounted on the end-portions of said block, and suspending means for the other end of the motor.

7. The combination of a support, a resilient block mounted thereon, a motor supported at one end on said block, suspending means for the other end of the motor, and means engaging the suspended end of the motor for holding it from lateral displacement.

8. The combination of a support, a resilient block mounted thereon, a motor supported at one end on said block, suspending means for the other end of the motor, and an upright guide engaging the suspended end of the motor.

9. The combination of a support, a resilient block mounted thereon, a motor supported at one end on said block, suspending means for the other end of the motor, and a standard mounted on said support at the suspended end of the motor and having a vertical slot which receives the adjacent shaft-bearing of the motor.

AUGUST DE KLEIST.
SELVIYOR A. SWANSON.